United States Patent

[11] 3,605,006

[72] Inventors Masaomi Nagae;
Sumio Yokokawa; Takehito Inoue, all of Kawasaki-shi, Japan
[21] Appl. No. 839,465
[22] Filed July 7, 1969
[45] Patented Sept. 14, 1971
[73] Assignee Fuji Denki Seizo Kabushiki Kaisha Kawasaki-shi, Japan
[32] Priority July 15, 1968, July 15, 1968, July 12, 1968
[33] Japan
[31] 43/60398, 43/60399 and 43/49222

[54] COMPOUND EXCITATION SYSTEM OF AC GENERATOR BY THYRISTOR CONTROL
4 Claims, 8 Drawing Figs.
[52] U.S. Cl. ............... 322/24, 322/25, 322/27, 322/28, 322/73
[51] Int. Cl. ............... H02p 9/30
[50] Field of Search ............... 322/20, 24, 25, 27, 28, 73

[56] References Cited
UNITED STATES PATENTS
3,058,050 10/1962 Eggeling ............... 322/75 X
3,076,134 1/1963 Bennett, Jr. et al. ............... 322/20

Primary Examiner—Oris L. Rader
Assistant Examiner—H. Huberfeld
Attorney—Holman & Stern ABSTRACT: For the excitation of an AC generator, a voltage being in proportion to the terminal voltage of the generator and a voltage being in proportion to the load current of the generator are combined vectorially, and the resultant sum-voltage is impressed on a field winding of the generator through a rectifying device with thyristors for the supply of a field current. Separately, an electric quantity of the same phase as the resultant voltage is prepared as a synchronizing signal for an ignition pulse regulator controlling the thyristors.

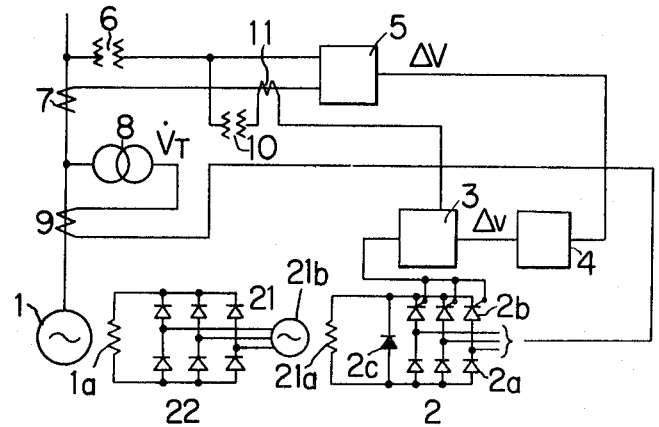
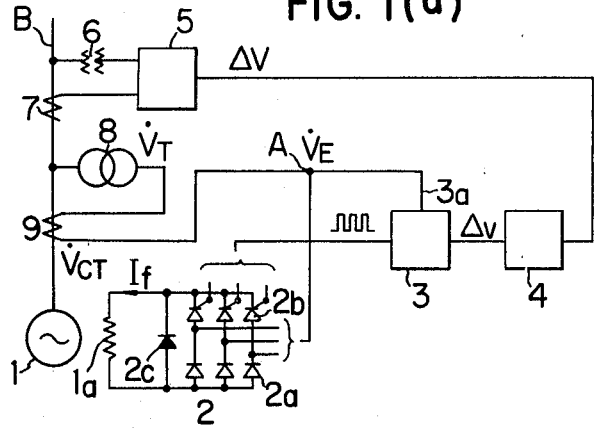
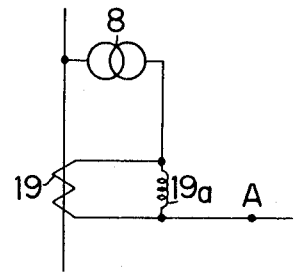
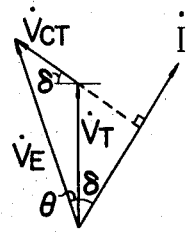
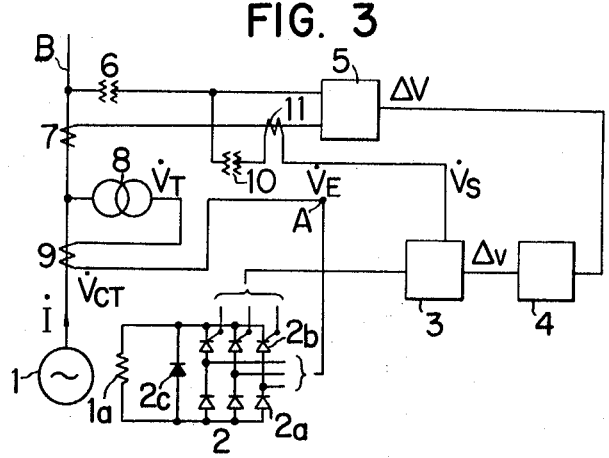

COMPOUND EXCITATION SYSTEM OF AC GENERATOR BY THYRISTOR CONTROL

BACKGROUND OF THE INVENTION

This invention relates to a thyristor excitation system of an AC generator to which a field current is supplied through a rectifying device with thyristors. More specifically, the invention relates to a thyristor excitation system of the so-called compound-type AC generator in which a vector summation of a voltage being in proportion to the terminal voltage of the generator and a voltage being in proportion to the load current of the generator is prepared as an excitation power source.

As generally known systems for the excitation of compound-type AC generators there are resultant current source system and a resultant voltage source system. In the former system, a component which is in proportion to a terminal voltage is derived from a reactor connected to a terminal, while a component which is in proportion to a load current is derived from a current transformer, and the components are combined. In the latter resultant voltage source system, a component being in proportion to a terminal voltage is led from a transformer, and a component being in proportion to a load current is obtained from a leakage transformer, a gap-provided current transformer, or a device comprising an ordinary current transformer and a reactor. For the supply of a desired field current to a field winding of a generator from the resultant current or voltage thus obtained, the impedance of a shunt circuit connected in parallel with the field winding is ordinarily varied in the resultant current source system, while in the resultant voltage source system, the impedance of an element connected in series with the field winding is varied.

Conventionally, the function of these variable impedance elements has been performed by saturable reactors, magnetic amplifiers, power transistors or thyristors. For the control of these variable impedance elements excluding thyristors, a DC analog electric quantity has been supplied thereto, either directly or after amplification. In this instance, the phase of a resultant current or resultant voltage to be controlled need not be considered so that a simplified control device can be employed but it becomes a slow-response excitation system. When thyristors are used, on the other hand, ignition pulses must be applied to the thyristors according to the phase of a current or voltage to be controlled. For this purpose the instant corresponding to zero ignition angle must be detected for each phase.

For the detection of a phase of a current or voltage to be controlled, it is preferable to introduce said current or voltage into a proper synchronizing signal generator, but such a current or voltage should be rectified by means of a rectifier or a rectifying device in a preceding stage of a field winding, so that a current of each phase contains a large quantity of harmonics due to rectification. Thus, it has not been possible to utilize such a current or voltage as a synchronizing signal as it is. In the past, therefore, a filter such as capacitor of large capacitance has been provided on an AC side of the rectifier, etc., in order to modify the wave form of the current or voltage into a sine wave, thereby to use said modified current or voltage as a synchronizing signal. However, this system has a drawback in the cost involved because of necessity the capacitors.

Thus, the application of thyristors for the control of resultant current or voltage has been considered impractical. Even when they are actually employed, only a terminal voltage of a generator is rectified by a rectifying device including thyristors and then controlled, or even when a load current of the generator is used for the excitation besides the terminal voltage, a load current derived from a current transformer is applied to a field winding after rectification thereof by means of a set of rectifiers, and also a terminal voltage is led either directly or through a transformer, to be rectified by a rectifying device including thyristors and then controlled and imparted to a field winding in parallel. In the former method, however, since only a terminal voltage is led, it must be always used at a large ignition angle in order to insure quick response, so that a field current accompanies relatively large ripple and also a filter must be provided in the field winding circuit, but undesirously this causes retard response.

In the latter method in which two currents are combined in parallel, although a field current due to a terminal voltage rectified and controlled may normally serve for desired control, a load current from a current transformer plays a primary role when a large fluctuation of load occurs. In this case, a great voltage due to the current transformer is applied as a reverse voltage to the thyristors and thus renders undesirable effects to them.

SUMMARY OF THE INVENTION

It is therefore an object of the present invention to perform the voltage control, reactive power control or power factor control of an AC generator by rectifying, through a rectifying device with thyristors, an excitation voltage source obtained by vectorial combination of a voltage being in proportion to a terminal voltage with a voltage being in proportion to a load current, wherein a detecting member is provided to obtain a synchronizing signal having a distortionless sine wave and the same phase as the excitation voltage in order to provide ignition pulses to the thyristors of the rectifying device with a correct phase difference and to effect desired field current control.

According to the present invention, for the purpose of attaining the above-mentioned objects, a thyristor excitation system of an AC generator, comprises first means for obtaining a voltage being in proportion to a terminal voltage of the AC generator, second means for obtaining a second voltage being in proportion to a load current of the generator, means for obtaining a first sum-voltage by vectorially combining the first voltage and second voltage, a rectifying device with thyristors for rectifying and controlling said sum-voltage to supply a field current to an excitation winding of the generator or an exciter, a regulator generating a control deviation between an electrical output of the generator such as the terminal voltage, a reactive power or a power factor of the generator and a reference value of the electrical output, third means for obtaining a third voltage being in proportion to the first voltage, fourth means for obtaining a fourth voltage being in proportion to the second voltage, means for obtaining a second sum-voltage of the same phase as the first sum-voltage by combining the third voltage and fourth voltage, and an ignition pulse regulator having the control deviation as input, provided with the second voltage as synchronizing signal and imparting phase-controlled ignition pulses to the thyristors of the rectifying device.

While it may be obvious that power transformers or instrument transformers are employed for the mentioned first and third means adapted to obtain voltages being in proportion to terminal voltage, the second and fourth means adapted to obtain voltages being in proportion to load current are derived by gap-provided current transformers, leakage transformers, or devices comprising an ordinary current transformer and reactor. In this case, voltage being in proportion to load current and advanced in phase by 90° is obtained in a secondary winding of each current transformer.

The first sum-voltage supplies a field current to the field winding through the rectifying device with thyristors, whereby harmonics due to rectification are contained in a field current on an AC side. And the transformers and gap-provided current transformers as excitation power source have relatively large internal impedance, so that the sum-voltage also contains harmonics. In this invention, however, the second sum-voltage is obtained by separately provided means, so that even though the synchronizing signal generator supplied with this sum-voltage contains means for flowing a slight distorsion current, each instant corresponding to zero ignition angle can be detected without trouble.

The rectifying device with thyristors may be a three-phase bridge composed of only six thyristors, for instance, or a three-phase bridge consisting of three diodes and three thyristors. Further, the thyristor excitation system of this invention may be used directly for a field winding of an AC generator and also it can excite a stator field winding of an AC exciter of the so-called brushless AC generator, in which the excitation is effected through a field winding of an exciter and especially through a rectifier provided on a rotor shaft.

BRIEF DESCRIPTION OF THE DRAWINGS

FIG. 1a is a single-line diagram representing a fundamental circuit of a thyristor excitation system, not according to the present invention;

FIG. 1b shows a modification of a part of FIG. 1a;

FIG. 2 is a voltage vector diagram to show the performance of the system of FIG. 1a;

FIG. 3 is a single-line diagram of the thyristor excitation system of an AC generator of this invention;

DETAILED DESCRIPTION OF THE INVENTION

Figure 4:
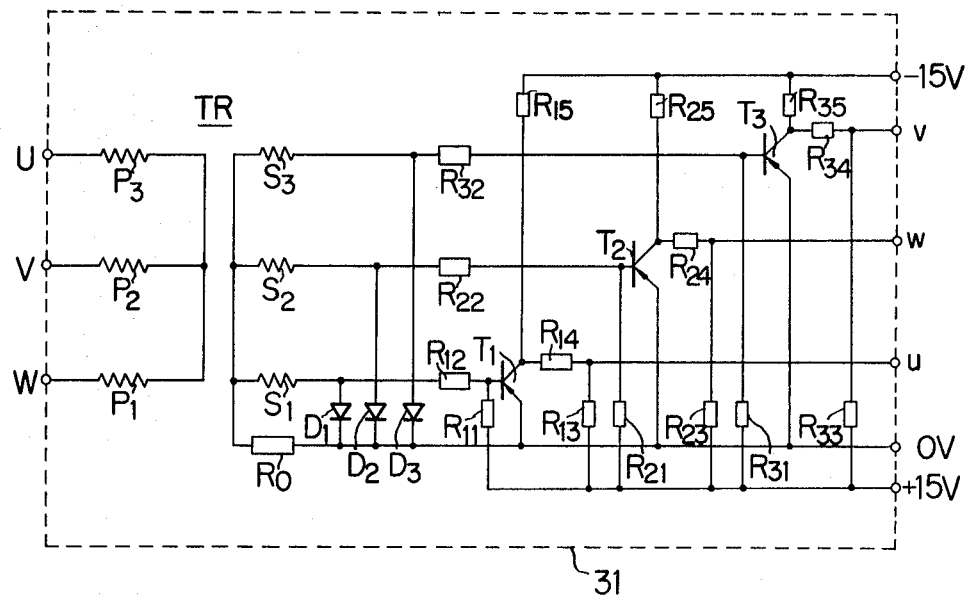
FIG. 4 is a circuit diagram illustrating an example of a synchronizing signal generator.

In FIG. 1a, the reference numeral 1 designates an AC generator, which is provided with a field winding 1a. The field winding 1a is connected to a DC output terminal of a rectifying device 2 comprising three diodes 2a and three thyristors 2b and is supplied with a rectified and controlled field current $I_f$. The numeral 2c represents a free wheel diode for commutation. An ignition pulse adjuster 3 including a synchronizing signal generator still to be described is provided for supplying ignition pulses to the thyristors 2b of the rectifying device 2, and thus the thyristors 2b are provided with phase-controlled ignition pulses having a phase difference of 120°. A voltage regulator 4 is provided in a preceding stage of the ignition pulse adjuster 3, said voltage regulator 4 receiving a voltage deviation ΔV generated by a voltage comparator 5 and supplying an amplified control deviation ΔV to the adjuster 3.

The reference numeral 6 designates an instrument transformer adapted to detect a terminal voltage of the generator 1, and 7 represents an instrument current transformer of a conventional type for compensation of a set voltage for a reactive current. In order to lead a desired sum voltage to an AC side of the rectifying device 2, a transformer 8 and a current transformer 9 with current-voltage conversion function such as a gap-provided current transformer are provided, the secondary windings of which are connected in series to generate a sum-voltage at a point A. In this instance, in place of the gap-provided current transformer or a leakage transformer 9, a device combining an ordinary current transformer 19 and a reactor 19a connected in parallel with a secondary winding thereof may be employed, as illustrated in FIG. 1b. The reference character B designates a power system to which the generator 1 is connected. A synchronizing signal for the ignition pulse control of the thyristors 2b is led through a wire 3a to the adjustor.

In FIG. 2, the vector $\dot{V}_T$ represents a voltage which is in proportion to a terminal voltage of the generator 1 and obtained from the transformer 8, and the load current vector $\dot{I}$ is delayed by an angle δ. A voltage $\dot{V}_{CT}$ being in proportion to a magnitude of a load current and obtained from the current transformer 9 is advanced in phase by 90° with respect to the load current $\dot{I}$. A vector sum-voltage of these two voltage is $\dot{V}_E$. This voltage is impressed to an AC side terminal of the rectifying device 2, and a current $I_f$ of a magnitude related to the ignition angle of the thyristors 2b and the impedance of the field winding 1a is flowed to the field winding 1a. The absolute value of the combined voltage $\dot{V}_E$ is nearly in proportion to a field current required according to a load condition at each instant of the generator, so that the ignition angle of the thyristors 2b is stationarily almost constant. However, when a load is fluctuated, a voltage to be impressed to the field winding has to be risen sharply, so that a margin of about two times of the normal ignition angle should preferably be prepared.

In the former thyristor excitation system as shown in FIG. 1a, the waveform of the synchronizing signal varies correspondingly to the ignition angles of the thyristors 2b, because it is led through the wire 3a from the excitation source which is rectified by thyristors 2b, and therefore correct zero point for the ignition pulses cannot always be obtained. According to the invention, an instrument transformer 10 for obtaining a voltage being in proportion to a terminal voltage of the generator 1 and a current-to-voltage converting current transformer 11 such as a gap-provided current transformer for obtaining a voltage being in proportion to a load current of the generator 1 are provided as shown in FIG. 3, in order to obtain ignition pulses with a phase difference of an exact 120° and with an ignition angle always corresponding to a certain control deviation in the three thyristors 2b. The corresponding parts are designated by the same numerals as in FIG. 1a.

In the drawing, the transformer 10 is connected to the secondary terminals of the instrument transformer 6. The current transformer 11 is inserted into a secondary circuit of an instrument current transformer 7, but may be directly inserted into a terminal of the generator 1. The secondary windings of these transformer 10 and current transformer 11 are connected in series and led to the synchronizing signal generator built in the adjuster 3. A resultant voltage $V_S$ obtained therein has the same phase as the resultant voltage $V_E$ at the point A.

The excitation system in FIG. 3 operates as follows: in the voltage comparator 5 an actual voltage detected through the instrument transformer 6 is compensated by a current component detected through the current transformer 7 to stabilize the voltage control for the reactive power of the generator 1 and the compensated actual voltage is compared with a set voltage therein to compose the voltage deviation ΔV. The deviation ΔV is amplified through the amplifier 4 and led to the ignition pulse adjusters 3 to control the phase of the ignition pulses repeated by 120°. The ignition pulses are impressed to the gates of thyristors 2b to regulate the magnitude of the excitation voltage on the field winding 1a in order that the terminal voltage of the generator 1 corresponds to the set voltage provided in the comparator 5.

In the following, a description is found of the ignition pulse phase adjuster 3, which comprises a synchronizing signal generator 31 shown in FIG. 4 and three ignition pulse generators 32, one of which is shown for U-phase pulses in FIG. 5. The resultant voltage $V_S$ obtained through the transformers 10 and 11 is led to the terminals U, V and W of the synchronizing signal generator 31, which consists primarily of an input transformer TR, selection diodes $D_1$, $D_2$, and $D_3$, and switching transistors $T_1$, $T_2$, and $T_3$. The transformer TR is provided with primary windings $P_1$ to $P_3$ and secondary windings $S_1$ to $S_3$ which are connected in star connection. A common resistor $R_o$ for shorting prevention is connected between the terminals of the secondary winding and a neutral point thereof through a diode $D_1$ or $D_3$. Further the terminals of the secondary winding are respectively connected through base resistors $R_{12}$, $R_{22}$ and $R_{31}$ to the bases of a transistor $T_1$ or $T_3$, while these bases are respectively impressed with a positive voltage of +15 v., for instance, through resistors $R_{11}$, $R_{21}$ and $R_{31}$. These transistors are of PNP-type, the emitters thereof being earthed in zero voltage. Besides the positive voltage terminal (+15v.), a negative voltage terminal (−15v.) is prepared; and connected therebetween are three voltage-dividing circuits comprising resistors $R_{13}$, $R_{14}$, $R_{15}$; $R_{23}$, $R_{24}$, $R_{25}$; and $R_{33}$, $R_{34}$, $R_{35}$.

Connection points between the resistors $R_{14}$ and $R_{15}$, $R_{24}$ and $R_{25}$, and $R_{34}$ and $R_{35}$ are respectively connected to the collectors of the transistors, while the connection points between the resistors $R_{13}$ and $R_{14}$, $R_{23}$ and $R_{24}$, and $R_{33}$ and $R_{34}$ form output terminals U, V and W.

Figure 6:
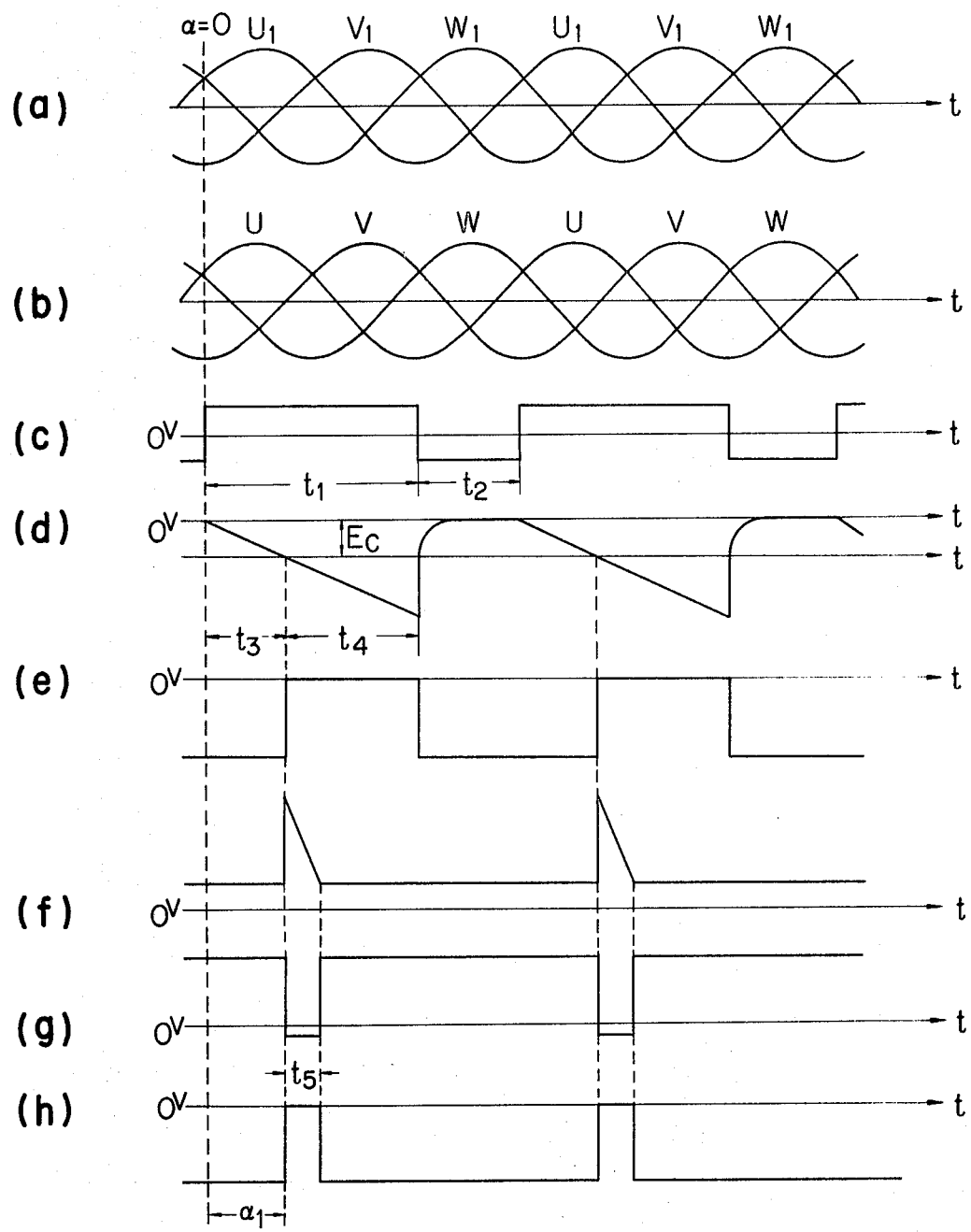
FIG. 6 shows the voltage waveforms of various parts with respect to time axes, being plotted to represent the performances of the synchronizing signal generator of FIG. 4 and the ignition pulse adjuster of FIG. 5; and, FIG. 7 is a single-line diagram of the thyristor excitation system of a brushless AC generator according to the present invention.

In FIG. 6, a waveform (a) represents resultant voltages $\vec{V}_E$ obtained at the sum point A in FIG. 3 and being a three-phase voltage of $U_1$, $V_1$ and $W_1$. As described above, harmonics (not shown) due to rectification are contained in the resultant voltages, so that the detection of an instant at which the ignition angle $\alpha$ is zero is difficult. A waveform (b) designates resultant voltages $\vec{V}_S$ for synchronization obtained from the transformer 10 and current transformer 11, and at least the phase voltages U, V and W are in the same phase as the phase voltages of the waveform (a).

When these resultant voltages U, V and W for synchronization are supplied to the primary winding of the transformer TR, the secondary windings thereof generate the same three-phase voltages. Inasmuch as the diodes $D_1$ through $D_3$ compose a three-phase half wave rectifier, currents flow through said diodes during an electric angle of 120°. This period corresponds to that of the case in which one of the phase voltages in the waveform (b) is greater than other phase voltages. When a current is made to flow through the diode $D_1$ by the W-phase voltage, the terminal of the secondary winding $S_1$ is maintained at zero potential and the base of the transistor $T_1$ is supplied with a positive voltage through the resistors $R_{11}$ and $R_{12}$, for example, with a positive voltage of +15 v. Thus the transistor $T_1$ is turned off, and a certain negative voltage determined by the voltage dividing resistors $R_{13}$, $R_{14}$ and $R_{15}$ is produced at the output terminal U of said transistor $T_1$. This state is represented by the period $t_2$ of the waveform (c) while this waveform (c) represents an output voltage of the output terminal u. During a period when the diode $D_1$ is not current flowed, that is, during a period of the remaining 240°, the W-phase voltage generated in the secondary winding $S_1$ is less than a voltage drop caused in the resistor $R_0$. And a switching current is flowed between the emitter and base of the transistor $T_1$ by virtue of a differential voltage therebetween, whereby this transistor is made to be conductive state. Thus the collector of the transistor $T_1$ has zero potential, and the potential of the output terminal U is shifted to a positive voltage determined by the voltage-dividing resistors $R_{13}$ and $R_{14}$. This corresponds to a period $t_1$ in the waveform (c). In a similar way, square waves which are identical but shifted in phase by 120° are generated in the other output terminals V and W, serving as synchronizing signal for an ignition pulse generator in a succeeding stage.

Figure 5:
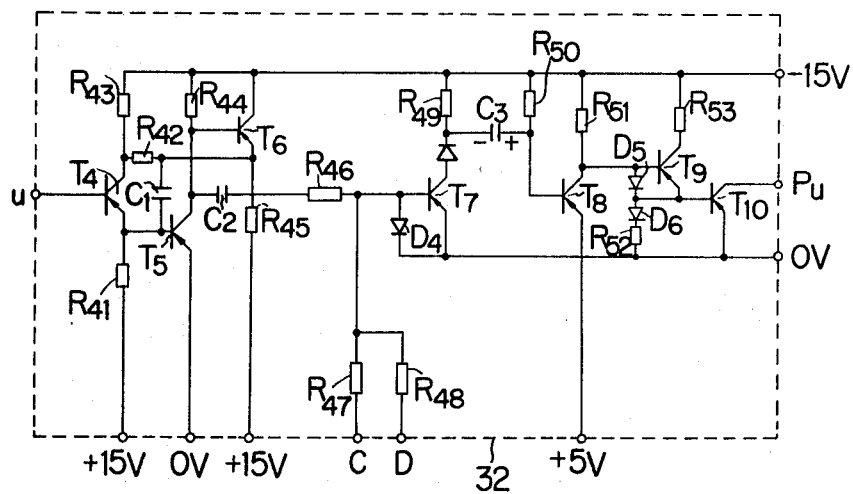
FIG. 5 is a circuit diagram illustrating an example of an ignition pulse generator.

A single-phase ignition pulse generator is illustrated in FIG. 5. This generator 32 is only for the phase U, but ignition pulse generators for the other phases V and W are the same therewith, through not illustrated in the drawing. The generator 32 is provided with transistors $T_4$ through $T_{10}$ and supplied with a square wave shown in FIG. 6 (c) to its input terminal. Since a synchronizing signal has a negative voltage in the period $t_2$, the transistor $T_4$ is conductive and a series circuit consisting of a capacitor $C_1$ and resistor $R_{42}$ is short circuited. In this instance, the values of the resistors are selected in such a manner that the emitter potentials of the transistors $T_4$ and (d). 5 have both zero potential, and the current amplification rate of the transistor $T_5$ is extremely heightened. The waveform of the emitter voltage of the transistor $T_6$ is illustrated in FIG. 6 (d), showing zero voltage in a period $T_2$. In this state the capacitor $C_1$ is not charged. When a positive voltage corresponding to the period $t_1$ of the synchronizing signal appears in the terminal, any current does not flow through the transistor $T_4$ and the capacitor $C_1$ is charged through a parallel circuit consisting of resistors $R_{42}$, $R_{43}$ and transistor $T_6$, and a resistor $R_{41}$. The capacitor $C_1$ is charged with a definite current by the operation of the transistors $T_5$ and $T_6$, and in the meantime the emitter potential of the transistor $R_4$ is maintained at nearly zero. Thus the potential at the connection point between the capacitor $C_1$ and resistor $R_2$ is dropped rectilinearly, drawing a voltage waveform as illustrated in FIG. 6 (d). At the same time, a negative voltage in the form of a sawtooth is formed at the base of the transistor $T_6$ and led to the base of the transistor $T_7$ through a capacitor $C_2$ and the resistor $R_{46}$. On the other hand, this vase is impressed with the output of the voltage regulator 4 in FIG. 3, that is, a control deviation $\Delta V$, from the terminal C through the resistor $R_{47}$. Simultaneously a positive bias voltage for the determination of a fundamental ignition angle is impressed thereto from the terminal D through the resistor 48. The total sum voltage is represented by $E_c$ in FIG. 6 (d), as a negative voltage for the sake of comparison. While the absolute value of the voltage $E_c$ is larger than that of the sawtooth-wave voltage, a differential voltage therebetween is positive, flowing a current to the diode $D_4$ and not to the transistor $T_7$. This period of noncurrent flow is designated by $t_3$. In this state the collector potential of the transistor $T_7$ is negative, −15 v. in the drawing. During a period $t_4$, when the absolute value of the sawtooth-wave voltage exceeds that of the voltage $E_c$, a differential voltage therebetween serves to flow a current to the transistor $T_7$, the collector potential of which is the same as an emitter potential, e.g., zero. Variation in the collector potential of the transistor $T_7$ is represented in FIG. 6 (e).

In the period $t_3$, on the other hand, current flows through the transistor $T_8$, the base potential of which is maintained at a certain value determined from the value of a resistor $R_{50}$ and that of resistance between the emitter and base thereof. The potential shows a positive value as shown in FIG. 6 (g). Accordingly the capacitor $C_3$ is charged in a polarity shown in the drawing in the period $t_3$, but in the period $t_4$, said capacitor discharges its charged electricity through resistors $R_{50}$ and $R_{49}$, with a result that a voltage drop due to the discharge current is caused at both ends of the resistor $R_{50}$. This voltage makes the transistor $T_8$ noncurrent flowing, the period of noncurrent flow being represented by $t_5$ V. Thus, in periods other than the period $t_5$, the transistor $T_8$ is current flowed, the collector potential thereof being +5V2 in the drawing. And during the period $t_5$ of noncurrent flow, this collector potential corresponds to a divided voltage determined according to a value of the resistor $R_{51}$ and the emitter-base resistive values of the transistors $T_9$ and $T_{10}$, said potential being slightly negative in this case, whereby the transistors $T_9$ and $T_{10}$ become conductive, thus leading zero potential to the output terminal $P_u$. On the other hand, since the potentials of the bases of the transistors $T_9$ and $T_{10}$ are at +5 V during the periods other than the period $t_5$, these transistors are not conductive, and, in this state, the potential of the terminal $P_u$ is changed to a relatively large negative potential, −40 V for instance, by means of an external circuit (not shown). The output waveform of the output terminal $P_u$ is shown in FIG. 6 (h). And the electric angle $\alpha 1$ between an instant when the ignition angle $\alpha$ is zero and an instant when the pulse rises proportionate to the magnitude of the control voltage $E_c$ applied from the terminals C and D of the ignition pulse generator 32. When the control deviation $\Delta v$ increases in a positive direction, the ignition angle $\alpha$ is increased likewise. In this instance the width of current-flow of the thyristor $2b$ of the rectifying device 2 is lessened, thus weakening a field current. This takes place in case the terminal voltage of the generator 1 is higher than a predetermined value. If the terminal voltage is equal to the predetermined value, the control voltage $E_c$ is established by only a bias voltage from the terminal D, whereby the ignition angle $\alpha$, in this instance, means an operative point during a nearly stationary running period and is selected at 90° for instance. On the other hand, if the control deviation $\Delta v$ is increased in a negative direction, the control voltage $E_c$ is decreased, with a result that the ignition angle $\alpha$ is likewise decreased, thus increasing the field current and also the terminal voltage of the generator.

Thus the present invention makes it possible to effectuate a desired excitation control through the processes in which a vector summation of a voltage being in proportion to the terminal voltage of a generator and a voltage being in proportion to the load current of the generator is utilized as an excitation power source of the generator, and this vector sum voltage is rectified and controlled perfectly by means of a rectifying device with thyristors.

In the foregoing embodiment of the invention, a thyristor excitation system has been described with respect to voltage control, but it is needless to say that the inventive system is applicable in cases of reactive power control and power factor control. And it is also possible that a field winding of an exciter is excited by the inventive thyristor excitation system, instead of the direct excitation of a field winding of an AC generator. That is, with reference to FIG. 7, the field winding 1a of the generator 1 is connected to the DC output terminal of the rectifier 22 comprising six diodes, while the AC terminal of the rectifier is connected with a rotary armature winding 21b of the exciter 21. The stationary field winding 21a of the exciter is excited by means of the rectifying device 2 comprising three diodes 2a, three thyristors 2b and free wheel diode 2c, as in FIG. 3. In this case, the rectifier 22 is mounted on a rotor shaft and this procedure omits slip rings and brushes for the feeding of power to the field winding 1a. The generator utilizing such an excitation system as described above is termed a brushless AC generator, and it will be obvious that the thyristor excitation system of this invention can be used for the excitation of that kind of the generators.

We claim:

1. A thyristor excitation system of AC generators, comprising first means for obtaining a first voltage being in proportion to a terminal voltage of an AC generator, second means for obtaining a second voltage being in proportion to a load current of the generator, means for obtaining a first sum-voltage by vectorially combining said first voltage and said second voltage, a rectifying device with thyristors to rectify and control said sum-voltage and supply a controlled field current to a field winding of the generator or an exciter thereof, a regulator for generating a control deviation between an electrical output of the generator and a reference value of the electrical output, third means for obtaining a third voltage being in proportion to said first voltage, fourth means for obtaining a fourth voltage being in proportion to said second voltage, means for obtaining a second sum-voltage of the same phase as said first sum-voltage by combining said third voltage and said fourth voltage, and an ignition pulse adjuster supplied, as input, with said control deviation and, as synchronizing signal, with said second sum-voltage and adapted to supply phase-controlled ignition pulses to said thyristors of said rectifying device.

2. A thyristor excitation system of AC generator, as claimed in claim 1, in which the first and second means are, respectively, a transformer and a gap-provided current transformer, and the means for obtaining the first sum-voltage consists of a circuit obtained by connecting the secondary windings of said transformers in series.

3. A thyristor excitation system of AC generator, as claimed in claim 1, in which the first and second means are, respectively, a transformer and a leakage current transformer, and the means for obtaining the first sum-voltage consists of a circuit obtained by connecting the secondary windings of said transformers in series.

4. A thyristor excitation system of AC generator, as claimed in claim 1, in which the first and second means are, respectively, transformer and a current transformer provided with a reactor connected in parallel to the secondary winding of said current transformer, and the means for obtaining the first sum-voltage consists of a circuit obtained by connecting the secondary windings of said transformers in series.